(12) United States Patent
Zhou et al.

(10) Patent No.: US 11,579,477 B2
(45) Date of Patent: Feb. 14, 2023

(54) ELECTRICALLY CONTROLLED SMART WINDOW, PREPARATION METHOD THEREOF, AND LIGHT-ADJUSTING METHOD THEREOF

(71) Applicants: South China Normal University, Guangdong (CN); Shenzhen Guohua Optoelectronics Co., Ltd., Guangdong (CN); Academy of Shenzhen Guohua Optoelectronics, Guangdong (CN)

(72) Inventors: Guofu Zhou, Guangdong (CN); Hao Li, Guangdong (CN); Nan Li, Guangdong (CN)

(73) Assignees: South China Normal University, Guangdong (CN); Shenzhen Guohua Optoelectronics Co., Ltd., Guangdong (CN); Academy of Shenzhen Guohua Optoelectronics, Guangdong (CN)

( * ) Notice: Subject to any disclaimer, the term of this patent is extended or adjusted under 35 U.S.C. 154(b) by 141 days.

(21) Appl. No.: 16/491,086

(22) PCT Filed: Nov. 15, 2017

(86) PCT No.: PCT/CN2017/110990
§ 371 (c)(1),
(2) Date: Sep. 4, 2019

(87) PCT Pub. No.: WO2019/010889
PCT Pub. Date: Jan. 17, 2019

(65) Prior Publication Data
US 2020/0026113 A1 Jan. 23, 2020

(30) Foreign Application Priority Data
Jul. 10, 2017 (CN) .......................... 201710558110.3

(51) Int. Cl.
*G02F 1/1333* (2006.01)
*G02F 1/166* (2019.01)
(Continued)

(52) U.S. Cl.
CPC ............ *G02F 1/1333* (2013.01); *C09K 19/38* (2013.01); *G02B 26/02* (2013.01); *G02F 1/166* (2019.01);
(Continued)

(58) Field of Classification Search
CPC ........ G02F 1/1333; G02F 1/166; G02F 1/167; G02F 2202/023; G02F 2001/1678; C09K 19/38; C09K 2019/0448; C02B 26/02
(Continued)

(56) References Cited

U.S. PATENT DOCUMENTS

| 6,184,856 B1 | 2/2001 | Gordon et al. |
| 6,751,007 B2 | 6/2004 | Liang et al. |

(Continued)

FOREIGN PATENT DOCUMENTS

| CN | 1402069 A | 3/2003 |
| CN | 1410823 A | 4/2003 |

(Continued)

OTHER PUBLICATIONS

Ju et al. Research Progress on Smart Windows Based on Polymer Liquid Crystal, Journal of South China Normal University (Natural Science Edition), 49(1), Feb. 28, 2017, pp. 21-25.
(Continued)

*Primary Examiner* — Ruiyun Zhang
(74) *Attorney, Agent, or Firm* — Leason Ellis LLP (57) ABSTRACT

An electrically controlled smart window, which includes two transparent plates arranged oppositely, a power supply component and an in-between light-adjusting area. Hereinto the light-adjusting area is divided into a matrix of light- (Continued)

adjusting units by pixel wall(s), and every units are closely arranged in a grid shape. To the power supply component, an electrode is connected with the pixel wall, and another is localized on the center of light-adjusting unit and did with the transparent plate. Both surface-charged liquid crystal polymer particles and conductive packing fluid are filled into the medium between the two transparent plates. According to the present disclosure, cholesteric liquid crystal polymer microparticles with specific reflection band and surface charges are used as basic reflectors, thereby achieving the significant advantages of being easy to manufacture, low cost, and stable performance, without causing interference to electromagnetic signals.

4 Claims, 3 Drawing Sheets

(51) Int. Cl.
*G02B 26/02* (2006.01)
*G02F 1/167* (2019.01)
*C09K 19/38* (2006.01)
*G02F 1/1675* (2019.01)
*C09K 19/04* (2006.01)

(52) U.S. Cl.
CPC ...... *G02F 1/167* (2013.01); *C09K 2019/0448* (2013.01); *G02F 2001/1678* (2013.01); *G02F 2201/12* (2013.01); *G02F 2202/023* (2013.01)

(58) Field of Classification Search
USPC .................................................. 359/296, 299
See application file for complete search history.

(56) References Cited

U.S. PATENT DOCUMENTS

| | | | | |
|---|---|---|---|---|
| 2003/0048522 A1* | 3/2003 | Liang | .................. | H04N 13/337 |
| | | | | 359/296 |
| 2005/0243406 A1* | 11/2005 | Chung | ..................... | G02F 1/09 |
| | | | | 359/296 |
| 2010/0110530 A1* | 5/2010 | Homma | .................. | G02F 1/167 |
| | | | | 526/347 |

FOREIGN PATENT DOCUMENTS

| | | |
|---|---|---|
| CN | 1578928 | 2/2005 |
| CN | 102799019 | 11/2012 |
| CN | 104133319 | 11/2014 |
| CN | 104793381 | 7/2015 |
| CN | 104793391 | 7/2015 |
| CN | 105073907 | 11/2015 |
| CN | 105334643 | 2/2016 |
| CN | 105589252 | 5/2016 |
| CN | 105676515 | 6/2016 |
| CN | 106054304 | 10/2016 |
| CN | 106154539 A | 11/2016 |
| CN | 107077037 | 8/2017 |
| CN | 107272294 A | 10/2017 |
| FR | 2842916 | 1/2004 |
| JP | 2014112250 | 6/2014 |
| JP | 2015045786 | 3/2015 |

OTHER PUBLICATIONS

Li et al. Effect of Photo-Polymerization Time on the Photoelectric Properties of Infrared Reflectors Based on Polymer Liquid Crystals, Journals of South China Normal University (Nature Science Edition), 49(1), Feb. 28, 2017, pp. 17-20.

* cited by examiner

ELECTRICALLY CONTROLLED SMART WINDOW, PREPARATION METHOD THEREOF, AND LIGHT-ADJUSTING METHOD THEREOF

CROSS-REFERENCE TO RELATED PATENT APPLICATIONS

This application is a U.S. National Stage Application under 35 U.S.C. § 371 of International Patent Application No. PCT/CN2017/110990, filed Nov. 15, 2017, which claims the benefit of priority under 35 U.S.C. Section 119 of Chinese Patent Application number 201710558110.3 filed Jul. 10, 2017, both of which are incorporated by reference in their entireties.

TECHNICAL FIELD

The present disclosure is involved in the field of green building and decoration materials, and further focuses on an electrically controlled smart window based on charged suspended polymer particles, as well as its preparation method and light-adjusting method.

BACKGROUND

With the increasing emphasis on environmental protection and energy conservation, remarkable progress has been made in the rational use of energy and the development of energy-saving products. In the early 1980s, electrochromic materials were first proposed to be applied to energy-saving lighting systems such as buildings, automobiles and airplanes to form an "smart window" that may dynamically adjust a solar radiation transmittance. Until now, the research and application of the smart window still keep hot.

At present, the smart window is mainly divided into three categories: chrome smart window, i.e. coated glass with unidirectional heat reflection, defective to limited reflectivity, and potential hazard of heavy metal pollution; ionic crystal smart window, mainly based on an electrically controlled technology of metal or metal oxide, limited by electromagnetic signal shielding to interfere communication and navigation systems; and an electrophoresis or particle suspension smart window, featuring light selectivity and limited transmission angle of visible light.

Therefore, a smart window based on suspended liquid crystal particle comes into being. It can selectively reflect visible or infrared light with specific wave band via. Bragg reflection of self-assembled helix of cholesteric liquid crystal polymer. And infrared reflection can effectively weaken indoor heating effect originated from external heat radiation to reduce air conditioning consumption, especially in summer. However, even if electro-responsive, thermo-responsive and photo-responsive liquid crystal materials are available to adjust light transmission and reflection within a determined wave band, they are still limited by their own response capability, color change range and stimulation condition. So controllability and response speed are difficult to be improved greatly.

SUMMARY

An object of the present disclosure is to provide an electrically controlled smart window based on charged polymer suspended particles, which is suitable for selective transmitting and reflecting control on inner and outer windows of buildings, automobiles, airplanes, ships and the like to realize the light and temperature adjustment, and can also be used in a reflective display field.

Another object of the present disclosure is to provide a preparation method for the electrically controlled smart window.

Another object of the present disclosure is to provide a light-adjusting method for the electrically controlled smart window.

In order to achieve one of the objects above, the following technical solutions are adopted in the present disclosure.

An electrically controlled smart window comprises:

two transparent plates arranged oppositely, a power supply component and a light-adjusting area between the transparent plates, wherein the light-adjusting area is divided into a plurality of light-adjusting units by a pixel wall, and the light-adjusting units are closely arranged in a grid shape; one pole of the power supply component is connected with the pixel wall, and the other pole of the power supply component is connected with the transparent plate corresponding to a center of each light-adjusting unit; and liquid crystal polymer particles and a packing fluid are filled between the two transparent plates, and surfaces of the liquid crystal polymer particles are charged.

The pixel wall belongs to the field of panel display such as LCD, OLED, electric paper, etc., and photocuring of a photoresist is generally realized by glue dispenser, screen printing, etc. The pixel wall of the present disclosure is the same as the pixel wall in an electrowetting device, but an inner surface is conductive.

Each light-adjusting unit may be separately controlled.

Further, the surfaces of the liquid crystal polymer particles are subjected to protonation or ionization processing.

Further, the liquid crystal polymer particles are processed with an ionic surfactant, weak acid or weak base.

Further, the packing fluid is a colorless, transparent and non-electrolytic conducting liquid with a viscosity close to that of water and a density close to that of the liquid crystal polymer particles.

Further, the packing fluid is pure water, brine, low-density conducting silicone oil, an ionic liquid or an electrolyte alcohol solution.

The polymer suspended particles are polymerized by one or more liquid crystal polymer monomers, specifically, may be obtained by reaction of a nematic liquid crystal, a chiral liquid crystal, a photoinitiator and a polymerization inhibitor.

A method for preparing the electrically controlled smart window comprises:

S1. performing protonation or ionization processing to the surfaces of the liquid crystal polymer particles to charge the surfaces of the particles;

S2. taking a transparent plate with a conducting pixel wall as a substrate, and forming a frame around the substrate with a spacer;

S3. uniformly mixing the packing fluid and the charged liquid crystal polymer particles, and filling the mixture into the light-adjusting area;

S4. attaching a transparent plate used as a cover plate to the substrate to form a light-adjusting box, and a dot electrode being arranged on the cover plate corresponding to the center of each light-adjusting unit; and S5. sealing an edge of the light-adjusting area, and respectively connecting two poles of the power supply component with the pixel wall and the dot electrode of the cover plate.

Further, the liquid crystal polymer particles are prepared according to the following steps of:

S1. taking two transparent plates, and respectively coating a vertically aligned layer on inner surfaces of the two transparent plates;

S2. placing the surfaces of the two transparent plates coated with the vertically aligned layer in parallel inwardly, and packaging the two transparent plates with the spacer in a middle to form a liquid crystal cell;

S3. filling a mixed solution containing a photoinitiator, a polymerization inhibitor and a liquid crystal monomer into the liquid crystal cell, and irradiating, or heating and curing by ultraviolet light, so as to obtain a liquid crystal film; and S4. taking out the liquid crystal film and physically scrubbing the liquid crystal film to prepare the liquid crystal polymer particles; or directly preparing the liquid crystal polymer particles by combining a mask plate or a template method during curing.

The spacer is a pressure-sensitive adhesive filled with micron-sized inorganic particles with a single particle size to ensure that a spacing between the cover plate and the substrate is fixed after bonding.

Many kinds of vertically aligned layers are provided, self-oriented polyimide is commonly used, or non-oriented polyimide, polyvinyl alcohol and other materials are used, so as to make the vertically aligned layer in combination with scraping, scratching, printing and other preparation processes.

According to the light-adjusting method for the electrically controlled smart window above, reflection and absorption of light in a specific wave band are adjusted by controlling movement of the charged polymer particles through powering on and off. The charged liquid crystal polymer particles in the light-adjusting area are uniformly suspended in the packing fluid in an unpowered state, and the charged liquid crystal polymer particles are aggregated and adsorbed near the pixel wall in a powered state, so as to control light transmission and reflection effect.

The present disclosure has the beneficial effects as follow.

According to the present disclosure, based on a Bragg reflection characteristic of a cholesteric liquid crystal polymer spiral, liquid crystal polymer micro-particles that are charged in surface and reflect light of specific wave band are used as basic reflectors, thus having the remarkable advantages of easy preparation, low cost, stable performance and no interference with electromagnetic signals.

1. An array structure composed of tiny light-adjusting units is used in the present disclosure, which can obviously reduce a response time, can greatly improve an aggregation and dispersion speed of infrared reflecting liquid crystal polymer particles, and has characteristics of fast control speed and separate control. The specific performance is as follows.

(1) The smaller the light-adjusting unit is, the faster the aggregation or dispersion speed is, and the faster the response time of the smart window is. If the speed is close to a video response speed, the smart window can even be used as a display screen.

(2) Each light-adjusting unit can be separately controlled, so that the light-adjusting unit can at least be used for non-dynamic video display theoretically.

(3) Particle aggregation or dispersion can be controlled by changing a direction of current input or a direction of an electric field.

2. In order to enhance an electrically controlled effect, the surfaces of the polymer suspended particles are processed in the present disclosure, one method is to charge the surfaces of the particles through surface protonation or ionization, and the other method is to enable a tail end of the nematic liquid crystal to have a protonated or deprotonated group by changing components, so that the polymer suspended particles finally obtained are more stable without the problem of falling off and failure.

3. The electrically controlled smart window of the present disclosure has the advantages of low cost, fast response, large display area and the like. In addition to selective transmission or reflection of light of various wave bands, light of a certain wave band is selectively reflected to display different colors and contrasts, which is expected to be applied to reflective color display.

4. Compared with the technology disclosed in CN 104793391 A, the present disclosure is different as follows.

(1) Different control method of the infrared reflecting material: in CN 104793391 A, the electric field is used to drive electric response liquid crystal molecules in the packing fluid to turn, thus pushing an infrared reflecting liquid crystal polymer sheet to rotate from being perpendicular to incident light to parallel to the incident light, and realizing transformation from reflection to transmission; and according to the present disclosure, the electric field is used to directly attract infrared reflecting liquid crystal polymer materials to aggregate at the electrode, so as to realize transformation from reflection to total transmission.

(2) Different control object of the electric field: in CN 104793391 A, the electric field drives the electric response liquid crystal molecules (organic small molecules) in the packing fluid, while the electric field of the present disclosure directly drives the infrared reflecting material itself.

(3) Different component and requirement of the filing liquid: in CN 104793391 A, in addition to proper density and conductivity, the packing fluid must also contain rod-shaped liquid crystal small molecules with high electric field response to generate sufficient driving force to push the liquid crystal polymer sheet to rotate, while the present disclosure only has requirements on the conductivity, the density and the viscosity of the packing fluid, and the packing fluid can be a single component.

(4) Different requirement of the infrared reflecting material on morphology: in CN 104793391 A, the infrared reflecting material must be a polymer sheet, and a sheet morphology can be conducive to a maximum change from reflection to transmission under an overturning mechanism, which is not required in the present disclosure.

The advantages generated are as follows.

(1) Lower particle requirement: the polymer suspended particles of the present disclosure can be spherical, rod-shaped, sheet-shaped, etc., and do not have high requirement on particle size distribution, while CN 104793391 A requires that a liquid crystal polymer infrared reflector must be sheet-shaped, and a size thereof must be consistent as much as possible, which is preferably 25 microns, otherwise rotation effects of the liquid crystal sheet under the same potential are different, which can have great influence on an actual effect;

(2) more convenient driving: according to the present disclosure, only aggregation and then dispersion are needed, without direction requirement, while in CN 104793391 A, the liquid crystal polymer infrared reflector requires to be vertical rotated by 90°, with large driving force and requirement on the rotation direction, and the control is not easy to realize;

(3) short response time: according to the present disclosure, as long as the viscosity of the packing fluid is low enough and the driving force is sufficient, the aggregation and dispersion of particles are very fast, while in CN 104793391 A, the vertical rotation of the liquid crystal sheet by 90° completely depends on the electric field response of a carrier liquid crystal in the packing fluid, and then the liquid crystal sheet is driven to rotate by pure molecules, thus the process itself can be slower;

(4) good recoverability: according to the present disclosure, the aggregation and dispersion of the particles are fast and simple, the reflection and transmission can be easily and rapidly switched, and the recoverability is excellent, while in CN 104793391 A, the recoverability is a difficult problem, which is equivalent to that the liquid crystal sheet is vertically rotated by 90° again after being vertically rotated by 90°, so that the carrier liquid crystal in the packing fluid acts reversely again, which completely changes the orientation of the carrier liquid crystal, so that the recovery effect is not good, and the recovery is very slow; and (5) No restriction on viewing angle: according to the present disclosure, the particles are uniformly distributed, regardless of shape, spherical particles can also be available, and light can be reflected by the particles at any viewing angle, but in CN 104793391 A, based on the infrared reflecting liquid crystal polymer sheet, a transmission and reflection transformation effect in a direction completely perpendicular to incident light is best, but the effect can be reduced at oblique incidence.

DETAILED DESCRIPTION

The present disclosure is further described below with reference to the detailed embodiments.

First Embodiment

Figure 1:
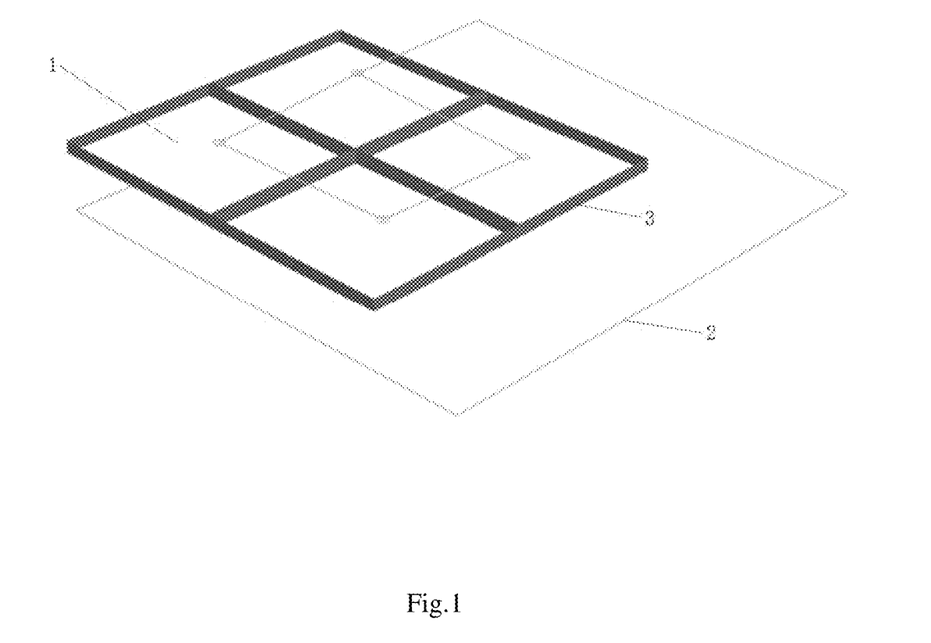
FIG. 1 is a structure schematic diagram of an electrically controlled smart window.
Figure 2:
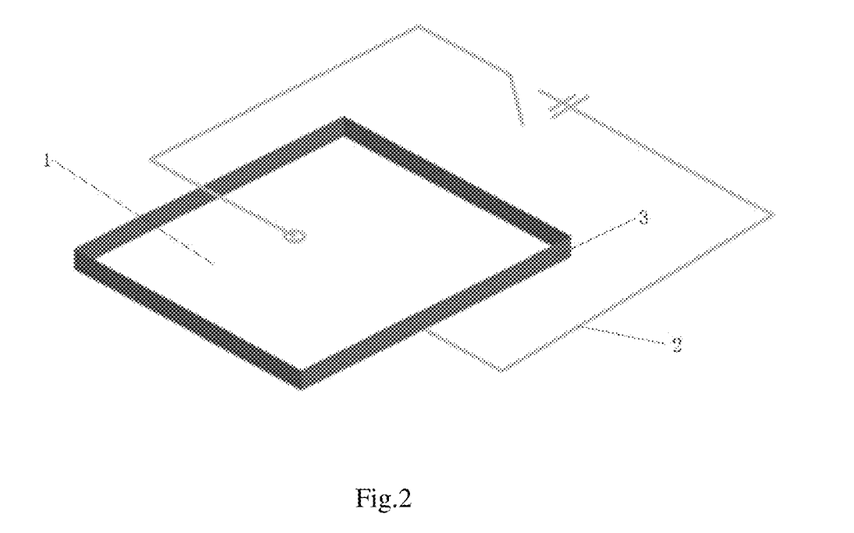
FIG. 2 is a structure schematic diagram of a single light-adjusting unit.
Figure 3:
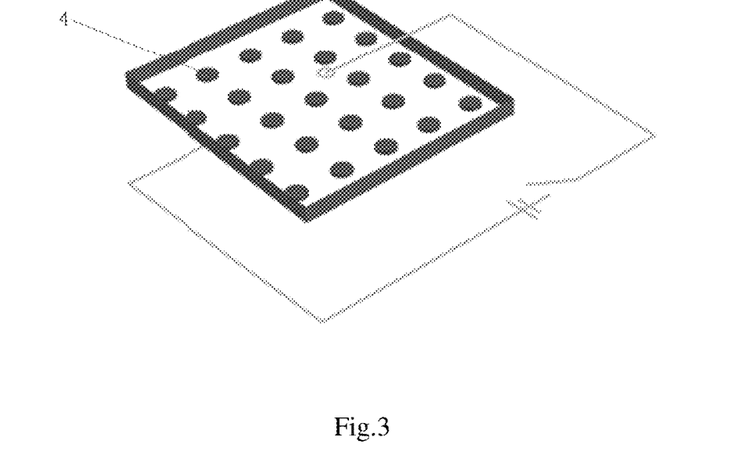
FIG. 3 is a schematic diagram illustrating distribution of liquid crystal polymer particles in the electrically controlled smart window in an unpowered state.

An electrically controlled smart window, as shown in FIG. 1 and FIG. 3, comprises:

two transparent plates 1 arranged oppositely, a power supply component 2 and a light-adjusting area between the transparent plates, wherein the light-adjusting area is divided into a plurality of light-adjusting units by pixel wall 3, and the light-adjusting units are closely arranged in a grid shape; one pole of the power supply component 2 is connected with the pixel wall 3, and the other pole of the power supply component is connected with the transparent plate corresponding to a center of each light-adjusting unit; and liquid crystal polymer particles and a packing fluid are filled between the two transparent plates, and surfaces of the liquid crystal polymer particles are charged.

The electrically controlled smart window is prepared according to the following steps of:

51. taking two transparent plates, and respectively coating a vertically aligned layer on inner surfaces of the two transparent plates;

S2. placing the surfaces of the two transparent plates coated with the vertically aligned layer in parallel inwardly, and packaging the two transparent plates with the spacer in a middle to form a liquid crystal cell;

S3. filling a mixed solution containing a photoinitiator, a polymerization inhibitor, a nematic liquid crystal and a chiral liquid crystal (component and content are shown in Table 1) into the liquid crystal cell, and irradiating by ultraviolet light, so as to obtain a liquid crystal film;

S4. taking out the liquid crystal film, and physically scrubbing the liquid crystal film to prepare the liquid crystal polymer particles with uniform size;

S5. processing the liquid crystal polymer particles with a sodium anion surfactant sodium dodecyl sulfate to negatively charge the surfaces of the particles;

S6. taking a transparent plate with a conducting pixel wall as a substrate, and forming a frame around the substrate with a spacer;

S7. uniformly mixing the packing fluid of a brine and the charged liquid crystal polymer particles, and filling the mixture into the light-adjusting area to fully fill the whole plate area;

S8. using a transparent plate as a cover plate, and completely attaching the cover plate with the substrate after aligning to form an electrically controlled transparent box filled with a dispersion liquid of the liquid crystal polymer particles in the middle, and a dot electrode being arranged on the cover plate corresponding to the center of each light-adjusting unit; and S9. sealing an edge of the light-adjusting area, and respectively connecting two poles of the power supply component with the pixel wall and the dot electrode of the cover plate.

TABLE 1

| Component and Content of Liquid Crystal | | |
|---|---|---|
| Component | | Content (wt %) |
| Nematic liquid crystal | A | 21.14 |
| | B | 42.29 |
| | C | 32.22 |
| Chiral liquid crystal | | 2.32 |
| Photoinitiator | | 2.01 |
| Polymerization inhibitor | | 0.02 |

The nematic liquid crystal A is (4-(3-acryloyloxypropoxy) benzoic acid 2-methyl-1,4-phenyl ester, the nematic liquid crystal B is 4-cyanophenyl 4'-(6-acryloyloxyhexyloxy) benzoic acid ester, the nematic liquid crystal C is 4-[[6-[(1-oxo-2-propenyl)oxy]hexyl]oxy]benzoic acid 4-methoxy phenyl ester, the chiral liquid crystal is 4-(3-(acryloyloxypropoxy) benzoyloxy-1 benzoic acid 2,6-dioxo-4,8-(1,5-linked) octacyclic ester, the photoinitiator is phenylbis(2,4,6-trimethylbenzoyl)phosphine oxide, and the polymerization inhibitor is hydroquinone. The nematic liquid crystal A has two polymerizable acrylate groups at the tail end, which is used as a monomer crosslinking agent.

As shown in FIG. 3, the charged liquid crystal polymer particles 4 in the light-adjusting area are uniformly suspended in the packing fluid in an unpowered state, the particles are uniformly and horizontally arranged in the light-adjusting area, and at the moment, light waves irradiate on the reflecting particles to selectively reflect and transmit light of a specific wavelength.

Figure 4:
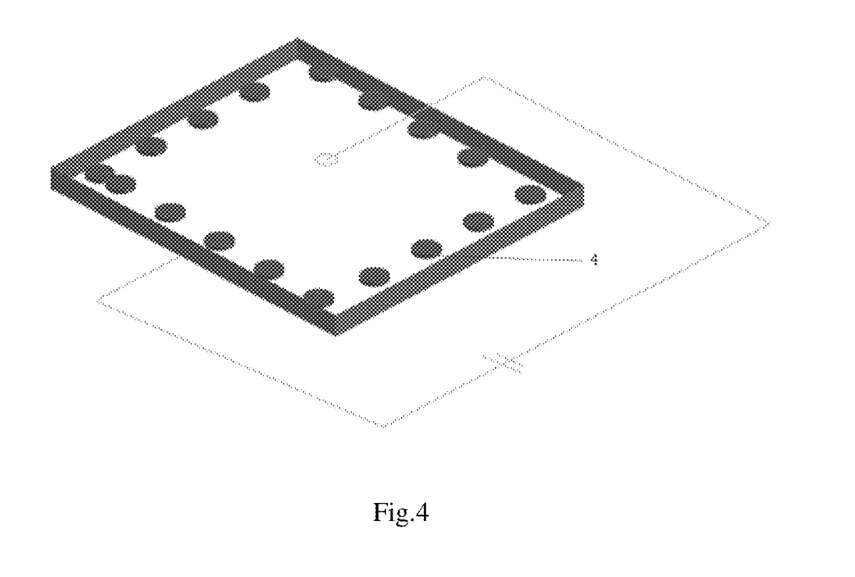
FIG. 4 is a schematic diagram illustrating distribution of the liquid crystal polymer particles in the electrically controlled smart window in a powered state.

As shown in FIG. 4, the charged liquid crystal polymer particles 4 are aggregated and adsorbed near the pixel wall in a powered state, and light directly transmitting the particles instead of irradiating on the particles, thus control the light transmission and reflection effect.

Figure 5:
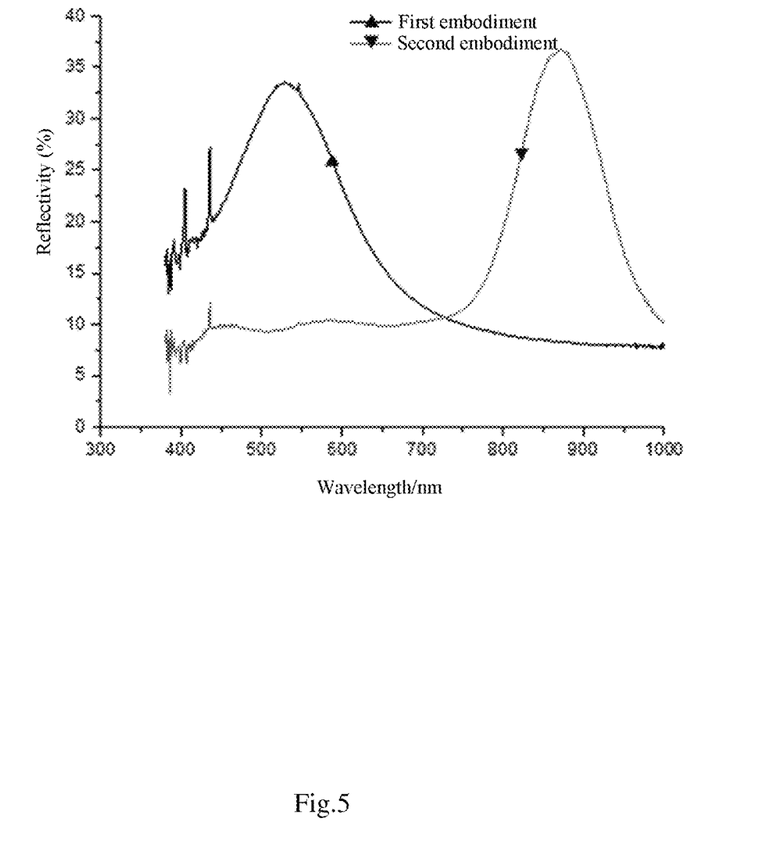
FIG. 5 illustrates a reflectivity of the electrically controlled smart window in a first embodiment and a second embodiment.

FIG. 5 illustrates a reflectivity of the electrically controlled smart window, corresponding to control of a visible light wave band.

Second Embodiment

The structure of the electrically controlled smart window is the same as that in the first embodiment.

The electronic control smart window is prepared according to the following steps of:

S1. taking two transparent plates, and respectively coating a vertically aligned layer on inner surfaces of the two transparent plates;

S2. placing the surfaces of the two transparent plates coated with the vertically aligned layer in parallel inwardly, and packaging the two transparent plates with the spacer in a middle to form a liquid crystal cell;

S3. filling a mixed solution containing a photoinitiator, a polymerization inhibitor, a nematic liquid crystal and a chiral liquid crystal (component and content are shown in Table 2) into the liquid crystal cell, and irradiating and curing by ultraviolet light, so as to obtain a liquid crystal film;

S4. taking out the liquid crystal film, and physically scrubbing the liquid crystal film to prepare the liquid crystal polymer particles with uniform size;

S5. processing the liquid crystal polymer particles with a cationic surfactant cetyl trimethyl ammonium bromide to positively charge the surfaces of the particles;

S6. taking a transparent plate with a conducting pixel wall as a substrate, and forming a frame around the substrate with a spacer;

S7. uniformly mixing the packing fluid of an ionic liquid and the charged liquid crystal polymer particles, and filling the mixture into the light-adjusting area to fully fill the whole plate area;

S8. using a transparent plate as a cover plate, and completely attaching the cover plate with the substrate after aligning to form an electrically controlled transparent box filled with a dispersion liquid of the liquid crystal polymer particles in the middle, and a dot electrode being arranged on the cover plate corresponding to the center of each light-adjusting unit; and S9. sealing an edge of the light-adjusting area, and respectively connecting two poles of the power supply component with the pixel wall and the dot electrode of the cover plate.

TABLE 2

Component and Content of Liquid Crystal

| Component | | Content (wt %) |
|---|---|---|
| Nematic liquid crystal | A | 20.96 |
| | B | 41.92 |
| | C | 31.44 |
| Chiral liquid crystal | | 2.32 |
| Photoinitiator | | 2.01 |
| Polymerization inhibitor | | 0.02 |

The nematic liquid crystal A is (4-(3-acryloyloxypropoxy) benzoic acid 2-methyl-1,4-phenyl ester, the nematic liquid crystal B is 4-cyanophenyl 4'-(6-acryloyloxyhexyloxy) benzoic acid ester, the nematic liquid crystal C is 4-[[6-[(1-oxo-2-propenyl)oxy]hexyl]oxy]benzoic acid 4-methoxy phenyl ester, the chiral liquid crystal is 4-(3-(acryloyloxypropoxy) benzoyloxy-1 benzoic acid 2,6-dioxo-4,8-(1,5-linked) octacyclic ester, the photoinitiator is phenylbis(2,4,6-trimethylbenzoyl)phosphine oxide, and the polymerization inhibitor is hydroquinone.

The charged liquid crystal polymer particles in the light-adjusting area are uniformly suspended in the packing fluid in an unpowered state, the particles are uniformly and horizontally arranged in the light-adjusting area, and at the moment, light waves irradiate on the reflecting particles to selectively reflect and transmit light of a specific wavelength.

The charged liquid crystal polymer particles are aggregated and adsorbed near the pixel wall in a powered state, and light directly transmitting the particles instead of irradiating on the particles, thus control the light transmission and reflection effect.

FIG. 5 illustrates a reflectivity of the electrically controlled smart window, corresponding to control of an infrared light wave band.

In the embodiment, the visible light wave band is selectively reflected by changing the ratio of the liquid crystal.

Third Embodiment

The structure of the electrically controlled smart window is the same as that in the first embodiment.

The electronic control smart window is prepared according to the following steps of:

S1. taking two transparent plates, and respectively coating a vertically aligned layer on inner surfaces of the two transparent plates;

S2. placing the surfaces of the two transparent plates coated with the vertically aligned layer in parallel inwardly, and packaging the two transparent plates with the spacer in a middle to form a liquid crystal cell;

S3. filling a mixed solution containing a photoinitiator, a polymerization inhibitor, a nematic liquid crystal and a chiral liquid crystal (component and content are shown in Table 3) into the liquid crystal cell, and heating and curing, so as to obtain a liquid crystal film;

S4. directly preparing the liquid crystal polymer particles by combining a mask plate or a template method;

S5. processing the liquid crystal polymer particles with weak base to deprotonate and negatively charge the liquid crystal polymer particles;

S6. taking a transparent plate with a conducting pixel wall as a substrate, and forming a frame around the substrate with a spacer;

S7. uniformly mixing the packing fluid of ethyl alcohol and the charged liquid crystal polymer particles, and filling the mixture into the light-adjusting area to fully fill the whole plate area;

S8. using a transparent plate as a cover plate, and completely attaching the cover plate with the substrate after aligning to form an electrically controlled transparent box filled with a dispersion liquid of the liquid crystal polymer particles in the middle, and a dot electrode being arranged on the cover plate corresponding to the center of each light-adjusting unit; and S9. sealing an edge of the light-adjusting area, and respectively connecting two poles of the power supply component with the pixel wall and the dot electrode of the cover plate.

TABLE 3

| Component and Content of Liquid Crystal | | |
|---|---|---|
| Component | | Content (wt %) |
| Nematic liquid crystal | A | 20.54 |
|  | B | 41.39 |
|  | C | 33.72 |
| Chiral liquid crystal |  | 2.32 |
| Photoinitiator |  | 2.01 |
| Polymerization inhibitor |  | 0.02 |

The nematic liquid crystal A is (4-(3-acryloyloxypropoxy) benzoic acid 2-methyl-1,4-phenyl ester, the nematic liquid crystal B is 4-carboxylphenyl 4'-(6-acryloyloxyhexyloxy) benzoic acid ester, the nematic liquid crystal C is 4-[[6-[(1-oxo-2-propenyl)oxy]hexyl]oxy]benzoic acid 4-methoxy phenyl ester, the chiral liquid crystal is 4-(3-(acryloyloxypropoxy)benzoyloxy-1 benzoic acid 2,6-dioxo-4,8-(1,5-linked) octacyclic ester, the photoinitiator is phenylbis(2,4,6-trimethylbenzoyl)phosphine oxide, and the polymerization inhibitor is hydroquinone.

The charged liquid crystal polymer particles in the light-adjusting area are uniformly suspended in the packing fluid in an unpowered state, the particles are uniformly and horizontally arranged in the light-adjusting area, and at the moment, light waves irradiate on the reflecting particles to selectively reflect and transmit light of a specific wavelength.

The charged liquid crystal polymer particles are aggregated and adsorbed near the pixel wall in a powered state, and light directly transmitting the particles instead of irradiating on the particles, thus control the light transmission and reflection effect.

In the embodiment, the visible light wave band is selectively reflected by changing the ratio of the liquid crystal, and one component in the liquid crystal formula has a carboxyl group at the tail end, which may be deprotonated and negatively charged.

Fourth Embodiment

The structure of the electrically controlled smart window is the same as that in the first embodiment.

The electronic control smart window is prepared according to the following steps of:

S1. taking two transparent plates, and respectively coating a vertically aligned layer on inner surfaces of the two transparent plates;

S2. placing the surfaces of the two transparent plates coated with the vertically aligned layer in parallel inwardly, and packaging the two transparent plates with the spacer in a middle to form a liquid crystal cell;

S3. filling a mixed solution containing a photoinitiator, a polymerization inhibitor, a nematic liquid crystal and a chiral liquid crystal (component and content are shown in Table 4) into the liquid crystal cell, and irradiating and curing by ultraviolet light, so as to obtain a liquid crystal film;

S4. taking out the liquid crystal film, and physically scrubbing the liquid crystal film to prepare the liquid crystal polymer particles with uniform size;

S5. processing the liquid crystal polymer particles with weak acid to protonate and positively charge the liquid crystal polymer particles;

S6. taking a transparent plate with a conducting pixel wall as a substrate, and forming a frame around the substrate with a spacer;

S7. uniformly mixing the packing fluid of a brine and the charged liquid crystal polymer particles, and filling the mixture into the light-adjusting area to fully fill the whole plate area;

S8. using a transparent plate as a cover plate, and completely attaching the cover plate with the substrate after aligning to form an electrically controlled transparent box filled with a dispersion liquid of the liquid crystal polymer particles in the middle, and a dot electrode being arranged on the cover plate corresponding to the center of each light-adjusting unit; and S9. sealing an edge of the light-adjusting area, and respectively connecting two poles of the power supply component with the pixel wall and the dot electrode of the cover plate.

TABLE 4

| Component and Content of Liquid Crystal | | |
|---|---|---|
| Component | | Content (wt %) |
| Nematic liquid crystal | 21.98 | 21.98 |
|  | 42.03 | 42.03 |
|  | 31.64 | 31.64 |
| Chiral liquid crystal |  | 2.32 |
| Photoinitiator |  | 2.01 |
| Polymerization inhibitor |  | 0.02 |

The nematic liquid crystal A is (4-(3-acryloyloxypropoxy) benzoic acid 2-methyl-1,4-phenyl ester, the nematic liquid crystal B is 4-aminophenyl 4'-(6-acryloyloxyhexyloxy) benzoic acid ester, the nematic liquid crystal C is 4-[[6-[(1-oxo-2-propenyl)oxy]hexyl]oxy]benzoic acid 4-methoxy phenyl ester, the chiral liquid crystal is 4-(3-(acryloyloxypropoxy)benzoyloxy-1 benzoic acid 2,6-dioxo-4,8-(1,5-linked) octacyclic ester, the photoinitiator is phenylbis(2,4,6-trimethylbenzoyl)phosphine oxide, and the polymerization inhibitor is hydroquinone.

The charged liquid crystal polymer particles in the light-adjusting area are uniformly suspended in the packing fluid in an unpowered state, the particles are uniformly and horizontally arranged in the light-adjusting area, and at the moment, light waves irradiate on the reflecting particles to selectively reflect and transmit light of a specific wavelength.

The charged liquid crystal polymer particles are aggregated and adsorbed near the pixel wall in a powered state, and light directly transmitting the particles instead of irradiating on the particles, thus control the light transmission and reflection effect.

In the embodiment, the visible light wave band is selectively reflected by changing the ratio of the liquid crystal, and one component in the liquid crystal formula has an amino group at the tail end, which may be protonated and positively charged.

The foregoing is only detailed embodiments of the present disclosure, but the protection scope of the present disclosure is not limited by the embodiments. Those skilled in the art can easily think up of modifications or replacements in the technical scope disclosed by the present disclosure, which shall fall within the protection scope of the present disclosure. Therefore, the protection scope of the present disclosure shall be subject to the protection scope limited by the claims.

The invention claimed is:

1. An electrically controlled smart window, comprising:
two transparent plates arranged oppositely;

a power supply component;

a light-adjusting area between the transparent plates, wherein the light-adjusting area is divided into a plurality of light-adjusting units by pixel wall(s), and the light-adjusting units are closely arranged in a grid shape, one pole of the power supply component is connected with the pixel wall, and the other pole of the power supply component is connected with the transparent plate corresponding to a center of each light-adjusting unit; and liquid crystal polymer particles and a packing fluid filled between the two transparent plates, wherein surfaces of the liquid crystal polymer particles are charged, and each of the liquid crystal polymer particles comprises at least one component having a carboxyl group at a tail end of the at least one component, and the at least one component is allowed to be deprotonated and negatively charged; wherein the packing fluid is ethyl alcohol.

2. The electrically controlled smart window of claim 1, wherein the surfaces of the liquid crystal polymer particles are subjected to protonation or ionization processing.

3. The electrically controlled smart window of claim 2, wherein the liquid crystal polymer particles are processed with an ionic surfactant, weak acid or weak base.

4. The electrically controlled smart window of claim 1, wherein the packing fluid comprises a colorless, transparent and non-electrolytic conducting liquid.

* * * * *